(12) United States Patent
Hashiguchi

(10) Patent No.: US 10,122,213 B2
(45) Date of Patent: Nov. 6, 2018

(54) WIRELESS POWER SUPPLYING SYSTEM

(71) Applicant: Sony Corporation, Tokyo (JP)

(72) Inventor: Takaaki Hashiguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 104 days.

(21) Appl. No.: 14/854,313

(22) Filed: Sep. 15, 2015

(65) Prior Publication Data

US 2016/0006269 A1    Jan. 7, 2016

Related U.S. Application Data

(63) Continuation of application No. 12/986,634, filed on Jan. 7, 2011, now Pat. No. 9,166,413.

(30) Foreign Application Priority Data

Jan. 15, 2010 (JP) ................. 2010-006523

(51) Int. Cl.
| | | |
|---|---|---|
| *H01F 38/00* | (2006.01) | |
| *H02J 50/12* | (2016.01) | |
| *H02J 50/50* | (2016.01) | |
| *H02J 5/00* | (2016.01) | |
| *H02J 17/00* | (2006.01) | |
| *B60L 11/18* | (2006.01) | |
| *H02J 7/02* | (2016.01) | |
| *H02J 50/10* | (2016.01) | |
| *H02J 50/90* | (2016.01) | |

(52) U.S. Cl.
CPC ............ *H02J 50/12* (2016.02); *B60L 11/182* (2013.01); *H02J 5/005* (2013.01); *H02J 7/025* (2013.01); *H02J 17/00* (2013.01); *H02J 50/10* (2016.02); *H02J 50/50* (2016.02); *H02J 50/90* (2016.02); *Y02T 10/7005* (2013.01); *Y02T 10/7072* (2013.01); *Y02T 90/122* (2013.01); *Y02T 90/14* (2013.01)

(58) Field of Classification Search
CPC ................................. H02J 7/025; H01F 38/14
USPC .......................................... 307/104, 149, 151
See application file for complete search history.

(56) References Cited

U.S. PATENT DOCUMENTS

| | | | |
|---|---|---|---|
| 3,544,922 A | 12/1970 | McConnell | |
| 2003/0218516 A1* | 11/2003 | Gilbert | .................. H01P 5/185 333/112 |

(Continued)

FOREIGN PATENT DOCUMENTS

| | | |
|---|---|---|
| CN | 101213758 A | 7/2008 |
| CN | 201230219 Y | 4/2009 |

(Continued)

OTHER PUBLICATIONS

Japanese Office Examination Report issued in connection with related counterpart Japanese patent application No. JP 2010-006523 dated Jan. 7, 2014.

(Continued)

*Primary Examiner* — Alfonso Perez Borroto
(74) *Attorney, Agent, or Firm* — Dentons US LLP

(57) ABSTRACT

Disclosed herein is a wireless power supplying system, including a power transmission device adapted to transmit power supplied thereto, a repeater device adapted to repeat the transmission power of the power transmission device, and a power reception device adapted to receive the power repeated by said repeater device.

14 Claims, 5 Drawing Sheets

(56) References Cited

U.S. PATENT DOCUMENTS

| | | | |
|---|---|---|---|
| 2005/0215198 A1* | 9/2005 | Fifield | H04B 1/0475 455/63.1 |
| 2009/0243394 A1* | 10/2009 | Levine | H02J 5/005 307/104 |
| 2010/0052431 A1 | 3/2010 | Mita | |
| 2010/0072826 A1 | 3/2010 | Baarman et al. | |
| 2010/0109445 A1* | 5/2010 | Kurs | B60L 11/007 307/104 |
| 2010/0123452 A1 | 5/2010 | Amano et al. | |
| 2010/0217353 A1 | 8/2010 | Forsell | |

FOREIGN PATENT DOCUMENTS

| | | |
|---|---|---|
| JP | 2001-185939 | 7/2001 |
| JP | 2010-219838 | 9/2010 |
| JP | 2010-537496 | 12/2010 |
| JP | 2011-527884 | 11/2011 |
| WO | WO/2009/023646 | 2/2009 |
| WO | WO/2010/006078 | 1/2010 |

OTHER PUBLICATIONS

Chinese Office Examination Report issued in connection with related counterpart Chinese Patent Application No. CN 201110002052.9 dated Jan. 30, 2014.

* cited by examiner

//WIRELESS POWER SUPPLYING SYSTEM

RELATED APPLICATION DATA

This application is a continuation of U.S. patent application Ser. No. 12/986,634 filed Jan. 7, 2011, the entirety of which is incorporated herein by reference to the extent permitted by law. The present application claims the benefit of priority to Japanese Patent Application No. JP 2010-006523 filed on Jan. 15, 2010 in the Japan Patent Office, the entirety of which is incorporated by reference herein to the extent permitted by law.

BACKGROUND OF THE INVENTION

1. Field of the Invention

This invention relates to a wireless power supplying system of the non-contacting power supplying type capable of carrying out supplying and reception of power in a non-contacting or wireless fashion.

2. Description of the Related Art

An electromagnetic induction method is known as a method for carrying out supplying of power in a wireless state.

Further, in recent years, attention is paid to a wireless power supplying system and a charging system which uses a method called magnetic field resonance method which utilizes an electromagnetic resonance phenomenon.

In a contactless power supplying system of the electromagnetic induction type which is used most widely at present, it is necessary for a power supply source and a power supply destination, which is the power reception side, to commonly use magnetic fluxes. Therefore, in order to transmit power efficiently, it is necessary to dispose the power supply source and the power supply destination very closely to each other, and also alignment for coupling is significant.

Meanwhile, a contactless power supply system which utilizes an electromagnetic resonance phenomenon is advantageous in that, from the principle of the electromagnetic resonance phenomenon, power can be transmitted over a greater distance than that by the electromagnetic induction system and besides, even if the alignment is somewhat rough, the transmission efficiency does not drop very much.

It is to be noted that, as the electromagnetic resonance phenomenon, not only magnetic field resonance but also electric field resonance are available.

For example, Japanese Patent Laid-Open No. 2001-185939 (hereinafter described as Patent Document 1) discloses a wireless power supplying system which adopts the magnetic field resonance method.

In the technique disclosed in Patent Document 1, power is transmitted from a power supplying coil connected to a power supplying circuit to a resonance coil, also called consonance coil, by electromagnetic induction. Further, modulation of the frequency is carried out a capacitor connected to the resonance coil.

In recent years, a wireless power transmission technique has been reported which achieves transmission of power of 60 W over a distance of 2 m by adopting the magnetic field resonance system which utilizes a resonance phenomenon of a magnetic field.

Also development of a "wireless power supply system" of a high efficiency has been reported which transmits power of 60 W to drive an electronic apparatus at a place spaced by 50 cm by adopting the magnetic field resonance system.

SUMMARY OF THE INVENTION

Incidentally, in a wireless power supplying system of the magnetic field resonance type, it is a possible idea to dispose a repeater device between a power transmission device and a power reception device to improve the efficiency of the system. However, in this instance, a maximum efficiency is obtained at a certain particular position.

Actually, when a repeater device is disposed, position displacement or angle displacement sometimes occurs and this decreases the efficiency.

In this instance, while it seems a possible idea to manually adjust the position and the angle by manual operation, a measuring instrument or technique for exclusive use is required for the adjustment. Therefore, it is difficult to implement the adjustment by manual operation.

Therefore, it is desirable to provide a wireless power supplying system wherein power can be supplied with a high power supplying efficiency without the necessity for a measuring instrument.

According to the present invention, there is provided a wireless power supplying system including a power transmission device adapted to transmit power supplied thereto, a repeater device adapted to repeat the transmission power of the power transmission device, and a power reception device adapted to receive the power repeated by the repeater device, the power transmission device including a first resonance element for receiving the power supplied thereto and transmitting the received power, the repeater device including a second resonance element for receiving and transmitting the power transmitted thereto through a magnetic field resonance relationship, the power reception device including a third resonance element for receiving the power transmitted thereto from the repeater device though a magnetic field resonance relationship, the repeater device including a driving section capable of adjusting at least one of a disposition angle and a disposition position of the second resonance element in response to power transmission information of at least one of the power transmission device and the power reception device.

With the wireless power supplying system, power can be supplied with a high power supplying efficiency without the necessity for a measuring instrument for an exclusive use or the like.

DETAILED DESCRIPTION OF THE PREFERRED EMBODIMENTS

In the following, embodiments of the present invention are described with reference to the drawings.

It is to be noted that the embodiments are described in order given below.

1. First Embodiment (first example of the configuration of the wireless power supplying system)
2. Second Embodiment (second example of the configuration of the wireless power supplying system)
3. Third Embodiment (third example of the configuration of the wireless power supplying system)
4. Fourth Embodiment (fourth example of the configuration of the wireless power supplying system)

1. First Embodiment

Figure 1:
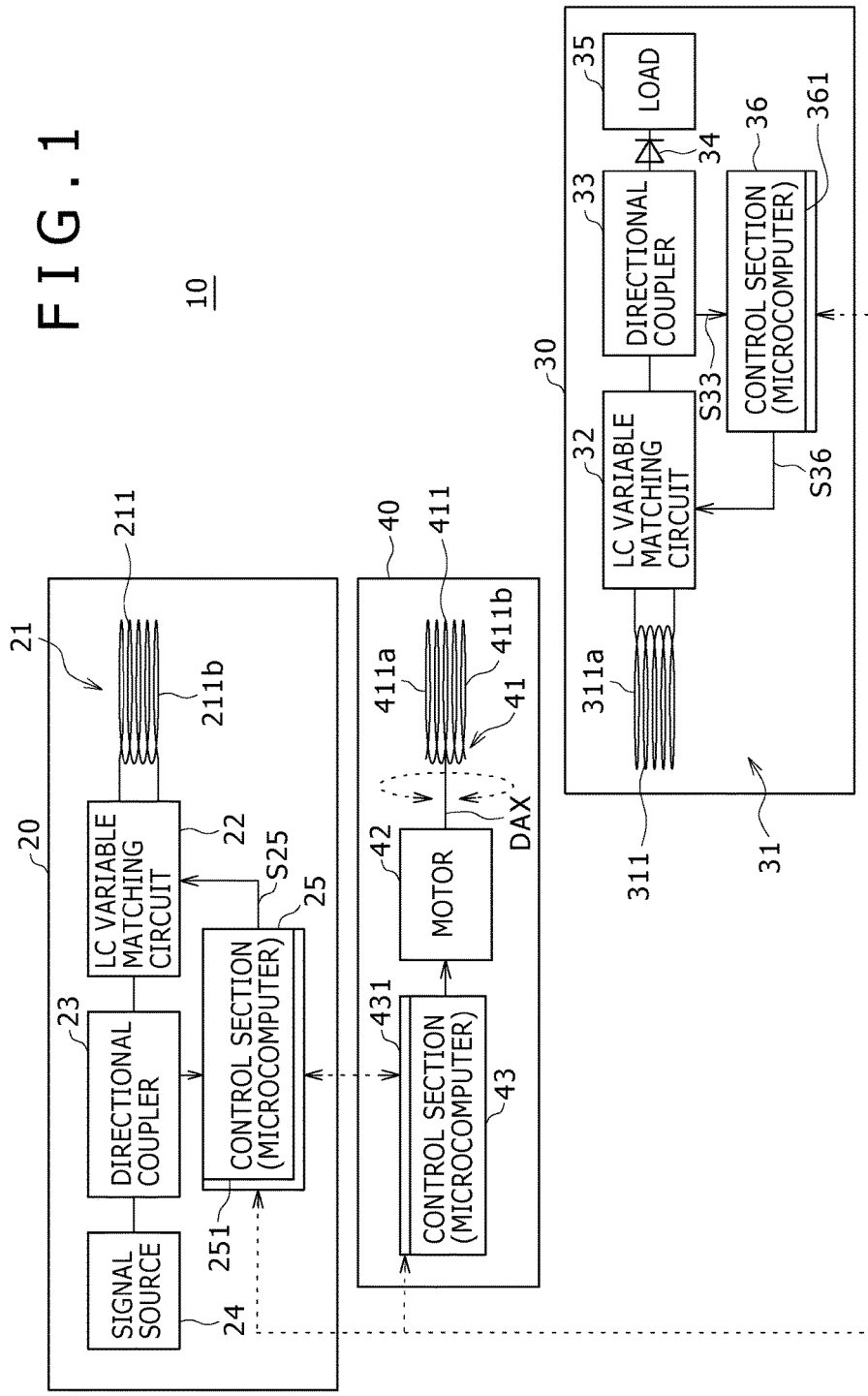
FIG. 1 is a block diagram showing an example of a configuration of a wireless power supplying system according to a first embodiment of the present invention.

FIG. 1 shows an example of a configuration of a wireless power supplying system according to a first embodiment of the present invention.

The wireless power supplying system 10 includes a power transmission device 20, a power reception device 30 and a repeater device 40.

The power transmission device 20 includes a power transmission coil section 21, a variable matching circuit 22 serving as a first variable matching section, a directional coupler or excessively reflected power detection circuit 23 serving as a first detection section, a high-frequency signal generation circuit or signal source 24 and a control section 25 serving as a first control section.

The power transmission coil section 21 includes a resonance coil 211 serving as a first resonance device. While the resonance coil is also called as consonance coil, the term resonance coil is used in the present specification.

The resonance coil 211 is formed from an air-core coil, and when the self resonance frequency thereof coincides with that of a resonance coil 411 of the repeater device 40 or a resonance coil 311 of the power reception device 30, a magnetic field resonance relationship is established in which power is transmitted efficiently.

The variable matching circuit 22 has an impedance matching function at a power supplying point of the resonance coil 211 for carrying out impedance matching in accordance with a control signal S25 supplied thereto from the control section 25 and adjusts the impedance so that power can be transmitted efficiently.

The directional coupler 23 has a function of detecting passing power and reflected power in power transmission and supplies a result of the detection as a signal S23 to the control section 25.

The directional coupler 23 supplies high frequency power, that is, AC power, generated by the high frequency signal generation circuit 24 to the variable matching circuit 22 side.

The high frequency signal generation circuit 24 generates high frequency power for wireless power transmission.

The high frequency power generated by the high frequency signal generation circuit 24 is supplied to the variable matching circuit 22 through the directional coupler 23 and supplied or applied to the resonance coil 211 of the power transmission coil section 21.

The control section 25 receives the detection result of the directional coupler 23 and outputs a control signal S25 to the variable matching circuit 22 so that high efficiency power transmission can be achieved by impedance matching of the variable matching circuit 22.

In other words, the control section 25 controls so that the self resonance frequency of the resonance coil 211 may coincide with that of the resonance coil 411 of the repeater device 40 or the resonance coil 311 of the power reception device 30 to establish a magnetic field resonance relationship to transmit power efficiently.

The control section 25 includes a wireless communication unit 251 including a wireless communication function and can communicate control information regarding the transmission efficiency and detection result information of the passing and reflected powers by wireless communication with a control section 36 of the power reception device 30 side and a control section 43 of the repeater device 40. For the wireless communication, for example, the Bluetooth, RFID or the like can be adopted.

The control section 25 is configured, for example, from a microcomputer.

The power reception device 30 includes a power reception coil section 31, a variable matching circuit 32 serving as a first or second variable matching section, and a directional coupler 33 serving as a first or second detection section.

The power reception device 30 further includes a rectification circuit 34, a load 35 which is an object of the supply of the received power, and a control section 36 serving as a first or second control section.

The power reception coil section 31 includes a resonance coil 311 serving as a third resonance element.

The resonance coil 311 is formed from an air-core coil, and when the self resonance frequency thereof coincides with that of the resonance coil 411 of the repeater device 40 or the resonance coil 211 of the power transmission device 20, a magnetic field resonance relationship is established, in which power is received efficiently.

The variable matching circuit 32 has an impedance matching function at a connecting portion or load terminal of the resonance coil 311 to the load for carrying out impedance matching in accordance with a control signal S36 supplied thereto from the control section 36, and adjusts the impedance so that power can be received efficiently.

The directional coupler 33 has a function of receiving received AC power to detect the passing and reflected powers in power transmission, and supplies a result of the detection as a signal S33 to the control section 36.

The excessively reflected power detection circuit 23 supplies received AC power to the rectification circuit 34.

The rectification circuit 34 rectifies the received AC power into DC power. A voltage stabilization circuit not shown converts the DC power supplied from the rectification circuit 34 into a DC voltage conforming to specifications of the electronic apparatus of the supplying destination of the DC power, and the stabilized DC voltage is supplied to a processing system of the electronic apparatus of the electronic apparatus which is the load 35.

The control section 36 receives the detection result of the directional coupler 33 and outputs a control signal S36 to the variable matching circuit 32 so that high efficiency power transmission can be carried out by impedance matching of the variable matching circuit 32.

In other words, the control section 36 controls so that the self resonance frequency of the resonance coil 311 may coincide with that of the resonance coil 411 of the repeater device 40 or the resonance coil 211 of the power transmission device 20 to establish a magnetic field resonance relationship to transmit power efficiently.

The control section 36 includes a wireless communication unit 361 including a wireless communication function and can communicate control information and detection result information of the passing and reflected powers with the control section 25 on the power transmission device 20 and with the control section on the repeater device side by wireless communication.

The control section 36 is configured, for example, including a microcomputer.

The repeater device 40 has a function of repeating power transmitted from the power transmission device 20.

The repeater device 40 includes a power transmission and reception coil section 41, a motor 42 serving as a driving section, and a control section 43 serving as a second or third control section.

The transmission and reception coil section 41 has a resonance coil 411 serving as a second resonance element.

The resonance coil 411 and the resonance coil 211 of the power transmission device 20 can be coupled to each other through a magnetic field resonance relationship, and the resonance coil 411 functions as a resonator at an intermediate stage.

Similarly, the resonance coil 411 and the resonance coil 311 of the power reception device 30 can be coupled to each other through a magnetic field resonance relationship, and the resonance coil 411 functions as resonator at an intermediate stage.

The resonance coil 411 is formed from an air-core coil and, when the self resonance frequencies of the resonance coil 411 and the resonance coil 311 of the power reception device 30 coincide with each other, a magnetic field resonance relationship is established in which power is transmitted efficiently.

The motor 42 rotates the resonance coil 411 by a predetermined angle around a drive shaft DAX, which extends perpendicularly to the axis of the resonance coil 411, in accordance with a control signal S43 from the control section 43.

The motor 42 adjusts the angle by which a one-side coil face 411a of the resonance coil 411 and a coil face 211a of the resonance coil 211 of the power transmission device 20 stand facing with each other and by which the other side coil face 411b of the resonance coil 411 and a coil face 311a of the resonance coil 311 of the power reception device 30 stand facing with each other.

In other words, the motor 42 rotates the resonance coil 411 around the drive shaft DAX so that the resonance coil 411, the resonance coil 211 of the power transmission device 20 and the power reception coil section 31 of the power reception device 30 are disposed on the same axis to achieve a maximum transmission efficiency.

The motor 42 can be configured, for example, from a stepping motor and can rotate in the opposite directions around the drive shaft DAX.

The control section 43 includes a wireless communication unit 431 having a wireless communication function and can transmit and receive control information regarding the transmission efficiency and detection result information of passing or reflected power by wireless communication to and from the control section 25 on the power transmission device 20 side and the control section 36 on the power reception device 30 side.

The control section 43 receives information of the control sections 25 and 36 and outputs a control signal S43 to the motor 42 serving as the driving section so that power transmission of a high efficiency can be carried out by impedance matching between the variable matching circuit 22 of the power transmission device 20 and the variable matching circuit 32 of the power reception device 30.

In other words, the control section 43 controls the motor 42 so that the self resonance frequency of the resonance coil 411 may coincide with the self resonance frequencies of the resonance coil 411 of the power transmission device 20 and the resonance coil 311 of the power reception device 30 to establish a magnetic field resonance relationship thereby to transmit the power efficiency.

The control section 43 is configured, for example, from a microcomputer.

In the present first embodiment, the resonance coil 411 is controlled to rotate around the drive shaft DAX so that the resonance coil 411 having the same self resonance frequency is disposed on the same line with and between the resonance coils 211 and 311 on the transmission side and the reception side as seen in FIG. 1.

In the present configuration, the resonance coil 211 and the resonance coil 411 are coupled to each other by magnetic field coupling while the resonance coil 411 and the resonance coil 311 are coupled to each other by magnetic field coupling. Therefore, the resonance coil 411 functions as the repeater device 40.

In the present first embodiment, when the resonance coil 411 is controlled to rotate around the drive shaft DAX so that the resonance coil 411 is disposed in a mutually aligned relationship at a middle point between the resonance coils 211 and 311, the efficiency is in the maximum.

Now, operation of the wireless power supplying system having the configuration described above is described.

In the power transmission device 20, the high frequency signal generation circuit 24 serving as a signal source generates an AC signal of a frequency equal to the self resonance frequency of the resonance coil 211. The AC signal is supplied to the resonance coil 211.

Therefore, in order to supply power without reflection, it is necessary to establish matching between the signal source and the resonance coil 211.

The passing power and the reflected power are detected by the directional coupler 23, and the variable matching circuit 22 is automatically adjusted by the control section 25 to establish matching thereby to supply power efficiently.

By the power reception device 30 side, power repeated by the repeater device 40 is received. However, the self resonance frequencies of the resonance coil 311 and the resonance coil 211 are equal to each other, and the power is supplied to the load 35 through the rectification circuit 34.

Therefore, in order to supply power without reflection, it is necessary to establish matching between the load 35 and the resonance coil 311.

The passing power and the reflected power are detected by the variable matching circuit 32, and the variable matching circuit 32 is automatically adjusted by the control section 36 to establish matching thereby to receive power efficiently.

Then, when the resonance coil 411 which is a repeater element of the repeater device 40 has the reference frequency equal to those of the resonance coil 211 and the resonance coil 311 and all of them are disposed on the same axis, a maximum efficiency is exhibited.

Thus, the control section 43 of the repeater device 40 communicates information with the control section 25 of the power transmission device 20 and the control section 36 of the power reception device 30 to control the motor 42 to adjust the angle so that the power is supplied efficiently.

In this manner, by disposing the resonance coil 411 of the repeater device 40 in an aligned relationship at the middle point between the resonance coil 211 of the power transmission device 20 and the resonance coil 311 of the power reception device 30, power can be supplied with a high supplying efficiency without the necessity for a measuring instrument for exclusive use and so forth.

Further, it is possible to extend the power supplying distance.

As a result, it is possible to achieve a power supplying distance exceeding the power transmission capacity of an ordinary magnetic field resonance system.

2. Second Embodiment

Figure 2:
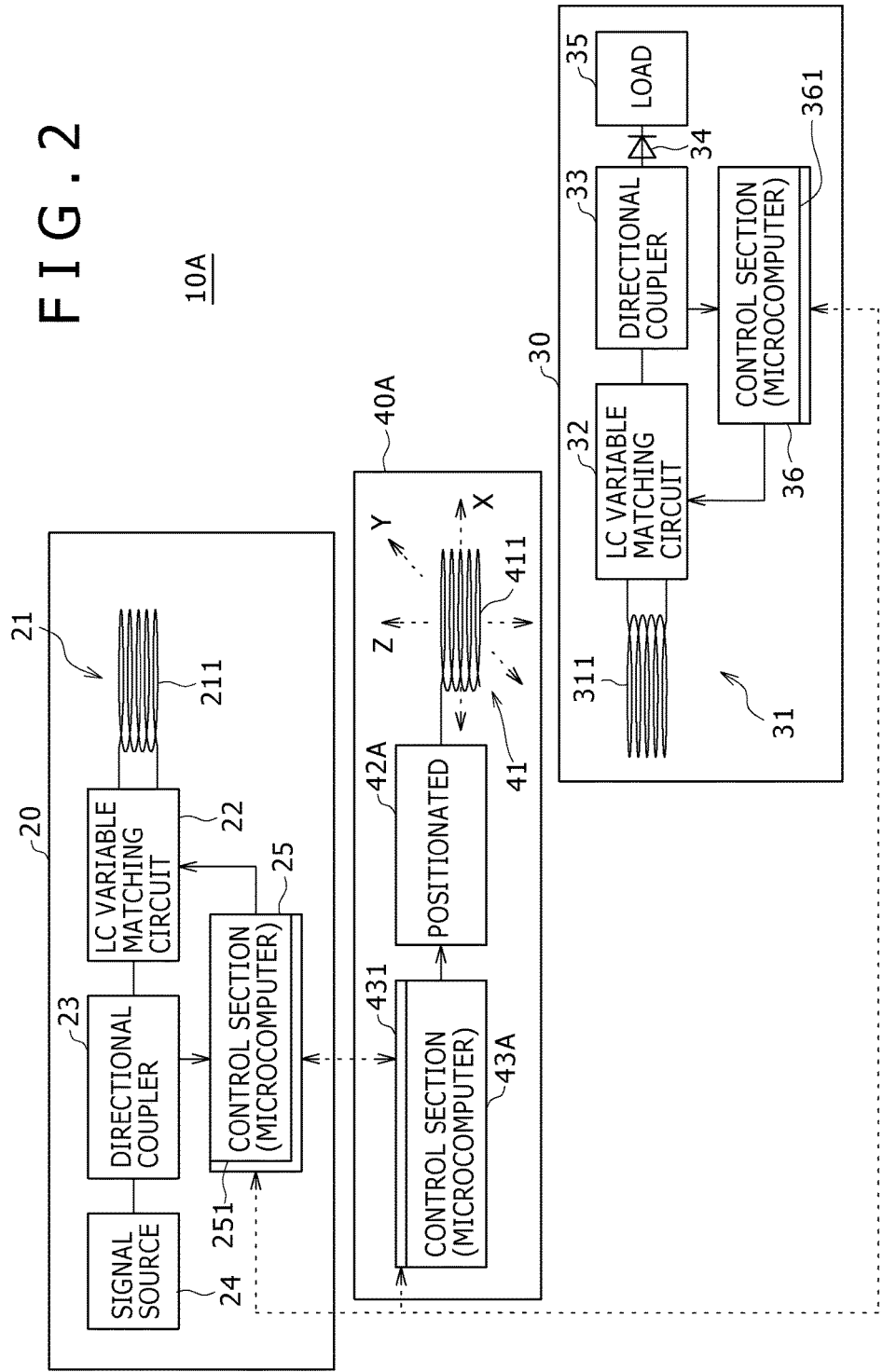
FIG. 2 is a block diagram showing an example of a configuration of a wireless power supplying system according to a second embodiment of the present invention.

FIG. 2 shows an example of a configuration of a wireless power supplying system according to a second embodiment of the present invention.

Referring to FIG. 2, the wireless power supplying system 10A according to the present second embodiment is similar to but different from the wireless power supplying system 10 according to the first embodiment in that the alignment adjustment mechanism for the resonance coil 411 of the repeater device 40A incorporates a positioner 42A in place of the rotary motor.

The positioner 42A can move the resonance coil 411 in the X, Y and Z directions of a Cartesian coordinate system shown in FIG. 2 to adjust the position of the resonance coil 411.

The repeater device 40A exhibits a maximum efficiency when the resonance coil 411 which is a repeater element has a resonance frequency equal to those of the power transmission side resonance coil 211 and the power reception side resonance coil 311 and the resonance coil 411 is positioned at a middle point between the resonance coils 211 and 311.

Therefore, in the repeater device 40A, the control section 43A communicates information with the control section 25 of the power transmission device 20 and the control section 36 of the power reception device 30 to control the positioner 42A to adjust the position so that power is supplied efficiently.

3. Third Embodiment

Figure 3:
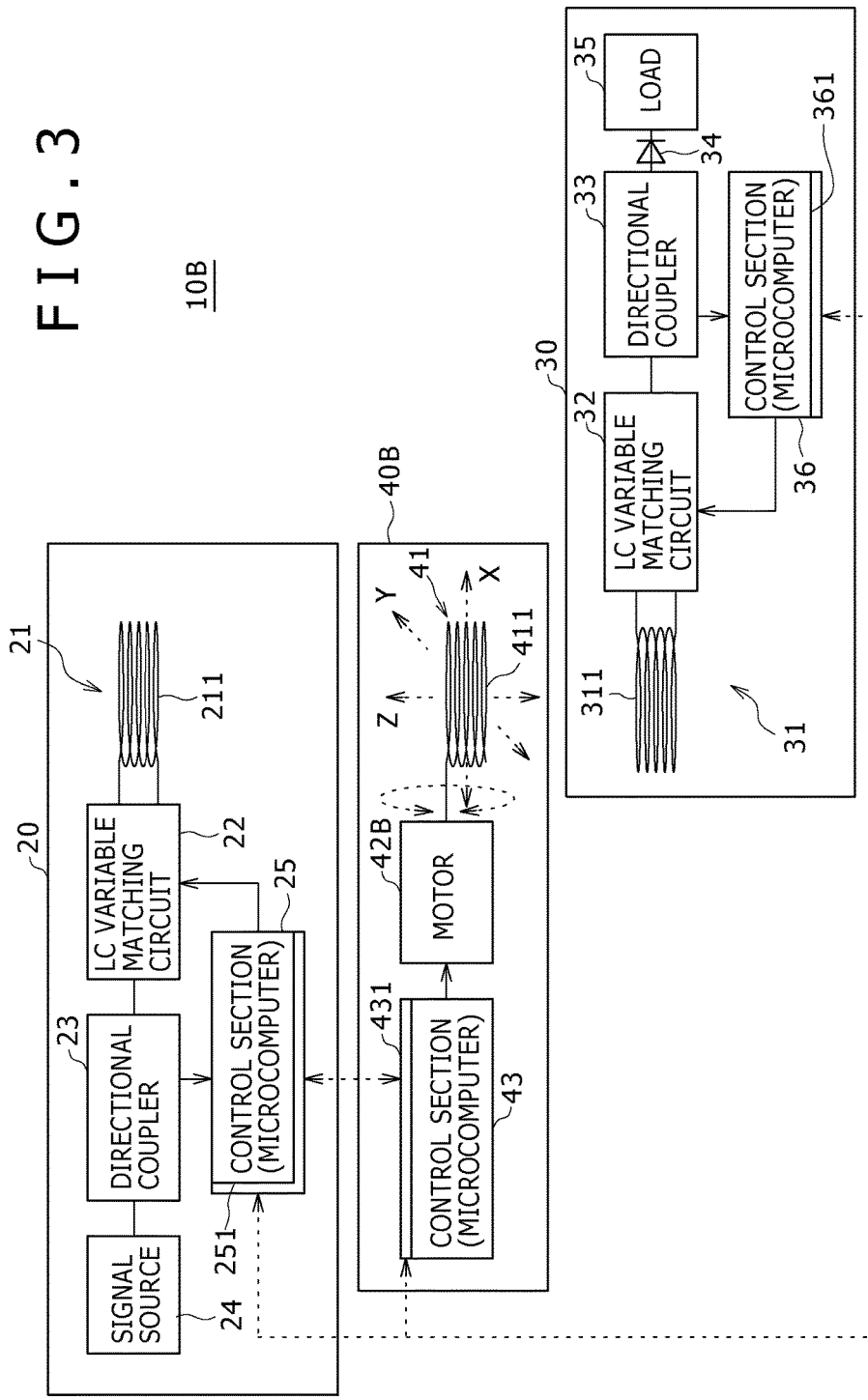
FIG. 3 is a block diagram showing an example of a configuration of a wireless power supplying system according to a third embodiment of the present invention.

FIG. 3 shows an example of a configuration of a wireless power supplying system according to a third embodiment of the present invention.

Referring to FIG. 3, the wireless power supplying system 10B according to the present third embodiment is similar to but different from the wireless power supplying systems 10 and 10A according to the first and second embodiments in that the driving section of the repeater device 40B additionally has functions of the motor and the positioner in the first and second embodiments.

In particular, the repeater device 40 includes, as the driving section thereof, a motor and positioner 42B which has a function of the motor 42 for angular adjustment in the first embodiment and a function of the positioner 42A for position adjustment of the second embodiment.

With the present third embodiment, the position and the angle of the resonance coil 411 of the repeater device 40B are adjusted to supply power efficiently.

4. Fourth Embodiment

Figure 4:
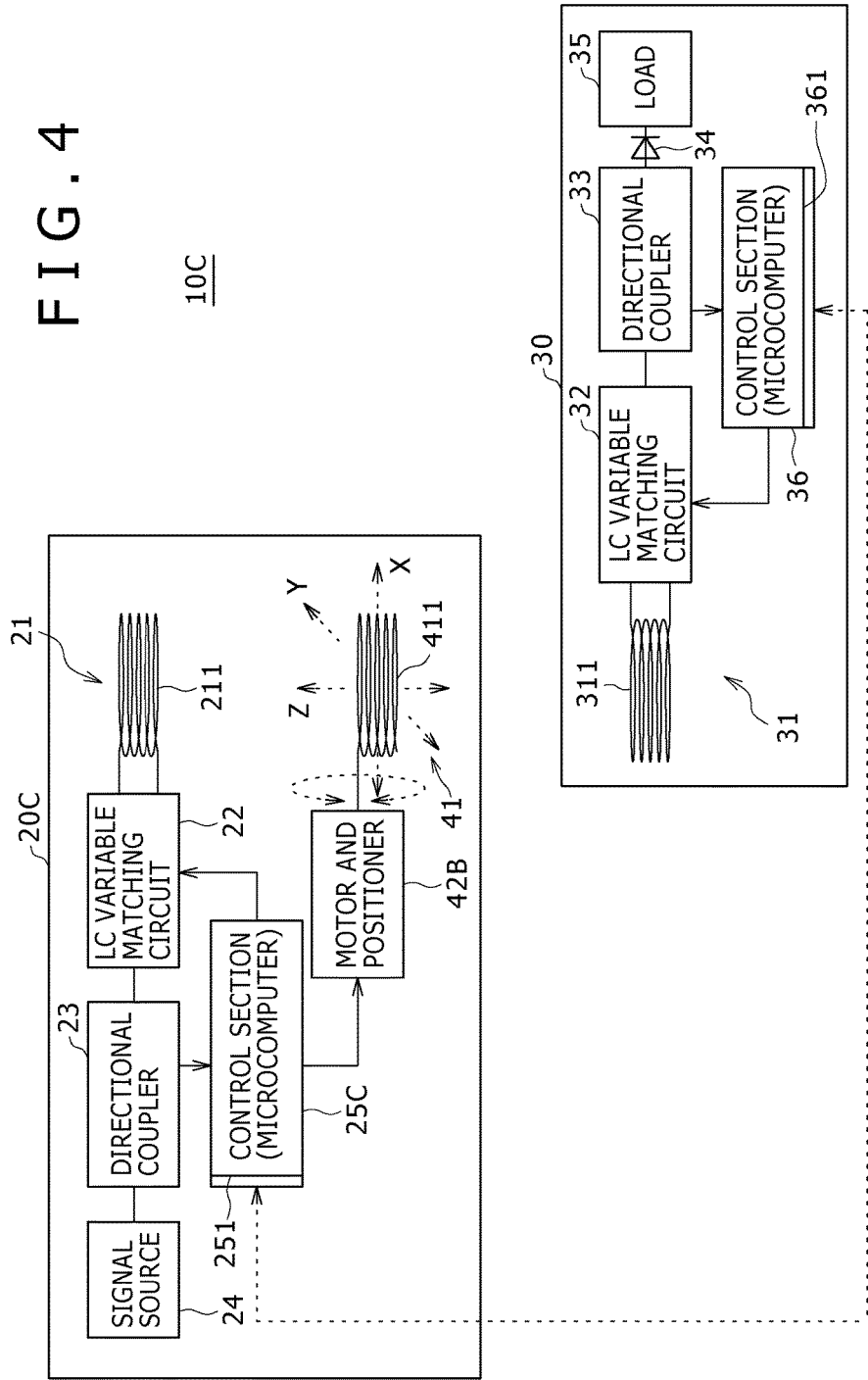
FIG. 4 is a block diagram showing an example of a configuration of a wireless power supplying system according to a fourth embodiment of the present invention.

FIG. 4 shows an example of a configuration of a wireless power supplying system according to a fourth embodiment of the present invention.

Referring to FIG. 4, the wireless power supplying system 10C according to the present fourth embodiment is similar to but different from the wireless power supplying system 10B according to the third embodiment in that the function of the repeater device 40B is incorporated in or integrated with the power transmission device 20C.

In this instance, the control section 25C carries out necessary control all together including control of the motor and positioner 42B.

It is to be noted that also it is possible to integrate the repeater device with the power receiving device similarly, and also it is possible to integrate all of the power transmission device, repeater device and power reception device.

[Application]

Figure 5:
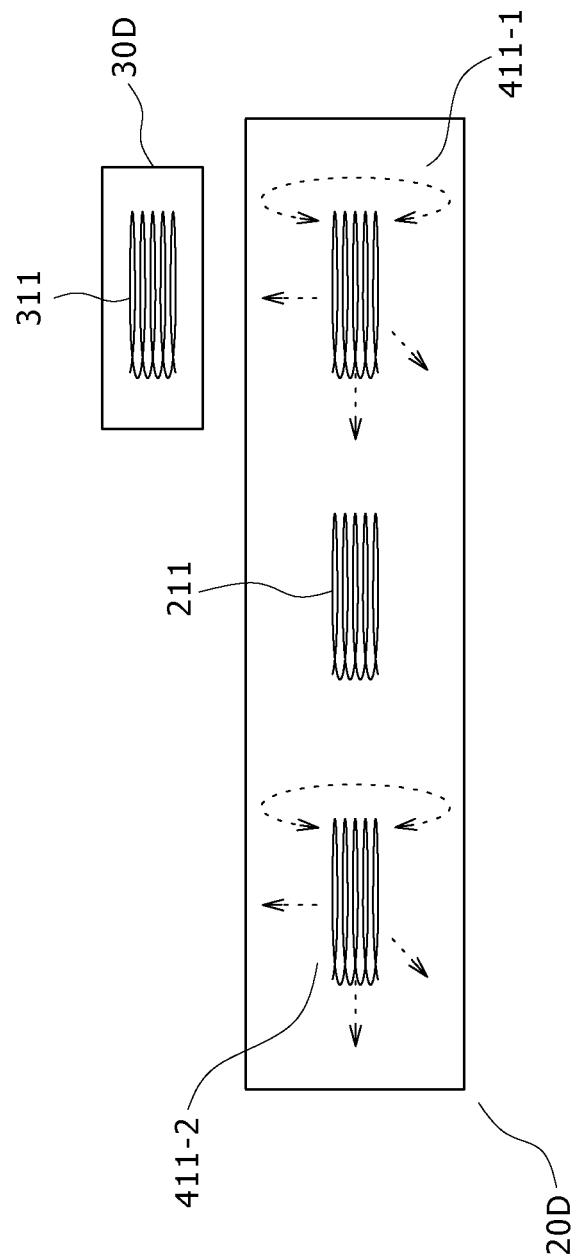
FIG. 5 is a view showing an example of an application of the wireless power supplying system according to the fourth embodiment of the present invention.

FIG. 5 shows equivalent blocks of an application of the wireless power supplying system according to the fourth embodiment of the present invention.

Referring to FIG. 5, the power transmission device 20D is structured such that it includes the resonance coils 411-1 and 411-2 as repeater elements as described hereinabove and is used, for example, as a power supplying desk or a power supplying mat.

The power reception device 30D is supplied with power to operate and may be a portable telephone set, a notebook type personal computer or a mouse.

The angle and the position of the resonance coils 411-1 and 411-2 serving as repeater elements are adjusted in response to the position of the power reception device 30D so that power is transmitted from the power transmitting device to the power receiving device in a maximum efficiency.

As described above, with the present embodiment, the following effects can be anticipated.

In particular, with the present embodiment, by disposing a repeater device between a power transmission device and a power reception device in a wireless power supplying system of the magnetic resonance type, the efficiency can be improved, and a maximum efficiency is exhibited at a particular position.

When a repeater device is actually disposed, positional displacement or angular displacement sometimes occurs and deteriorates the efficiency.

Therefore, in the present embodiment, the resonance coil of the repeater device is adjusted in response to a situation to eliminate a drop of the efficiency and maintain a maximum efficiency.

In this manner, with the present embodiment, a measuring instrument for exclusive use and so forth are not required and power can be supplied with a high power supplying efficiency.

Further, it is possible to extend the power supplying distance.

As a result, it is possible to achieve a power supplying distance exceeding the power transmission capacity of an ordinary magnetic field resonance system.

The present application contains subject matter related to that disclosed in Japanese Priority Patent Application JP 2010-006523 filed in the Japan Patent Office on Jan. 15, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A power transmission device comprising:
  a first resonance element;
  a power generation section configured to generate power supplied to the first resonance element;

a variable matching section coupled between the power generation section and the first resonance element and having an impedance matching function configured to match the impedance at a power supplying point of the first resonance element in accordance with a control signal;

a directional coupler coupled between the power generation section and the variable matching section and having a detection section configured to detect a state of power transmission by detecting passing power and reflected power and generating a signal indicating a power transmission efficiency based on a comparison of the reflected power and the passing power; and a first control section coupled to the directional coupler and configured to receive the signal generated by the detection section and coupled to the variable matching circuit and configured output the control signal to the variable matching section so as to raise a power transmission efficiency by impedance matching by the variable matching section based on the received result of the detection.

2. The power transmission device of claim 1 comprising a repeater device integrated with the power transmission device.

3. The power transmission device of claim 2, wherein the repeater device includes:
   a second resonance element for receiving and retransmitting power transmitted thereto by way of a magnetic field relationship; and
   a driving section capable of adjusting at least an angle or a position of the second resonance element in response to power transmission information of at least the power transmission device.

4. The power transmission device of claim 3, wherein the repeater device includes a second control section configured to receive control information regarding the power transmission from the first control section and control the driving section so as to adjust at least the angle or the position of the second resonance element based on the received control information.

5. The power transmission device of claim 4, wherein the control sections of the integrated devices are parts of a same device.

6. The power transmission device of claim 3, wherein the repeater device driving section adjusts the angle of the second resonance element in response to power transmission information of at least the power transmission device.

7. The power transmission device of claim 3, wherein the repeater device driving section adjusts the position of the second resonance element in response to power transmission information of at least the power transmission device.

8. A power reception device comprising:
   a first resonance element for receiving power wirelessly transmitted thereto;
   a load;
   a variable matching section having an impedance matching function configured to match the impedance at a connection portion of the first resonance element to a load in response to a control signal;
   a directional coupler coupled between the variable matching circuit and the load and having a detection section configured to detect a state of the transmitted power by detecting passing power and reflected power and generating a signal indicating a power reception efficiency based on a comparison of the passing power and the reflected power, the variable matching section coupled between the first resonance element and the directional coupler; and
   a first control section coupled to the directional coupler and configured to receive the signal generated by the detection section and coupled to the variable matching circuit and coupled to output the control signal to the variable matching section so as to raise the power reception efficiency by impedance matching by the variable matching section based on the received result of the detection.

9. The power reception device of claim 8, wherein a repeater device is integrated with the power reception device.

10. The power reception device of claim 9, wherein the repeater device includes:
    a second resonance element for receiving power transmitted thereto by way of a magnetic field relationship, and retransmitting the received power to the first resonance element; and
    a driving section capable of adjusting at least an angle or a position of the second resonance element in response to power reception information of at least the power reception device.

11. The power reception device of claim 10, wherein the repeater device includes a second control section configured to receive control information regarding the power reception of the first control section and control the driving section so as to adjust at least the angle or the position of the second resonance element based on the received control information.

12. The power reception device of claim 11, wherein the control sections of the integrated devices are parts of a same device.

13. The power reception device of claim 10, wherein the repeater device driving section adjusts the angle of the second resonance element in response to power reception information of at least the power reception device.

14. The power reception device of claim 10, wherein the repeater device driving section adjusts the position of the second resonance element in response to power reception information of at least the power reception device.

* * * * *